United States Patent
Pursell et al.

(10) Patent No.: US 9,266,787 B2
(45) Date of Patent: Feb. 23, 2016

(54) CONTROLLED RELEASE FERTILIZER WITH BIOPOLYMER COATING AND PROCESS FOR MAKING SAME

(71) Applicant: NFT Industries, LLC, Mountain Brook, AL (US)

(72) Inventors: Taylor Pursell, Mountain Brook, AL (US); Arthur R. Shirley, Jr., Florence, AL (US); Keith D. Cochran, Killen, AL (US); Joseph M. Miller, Killen, AL (US); Timothy G. Holt, Florence, AL (US); Gregory S. Peeden, Killen, AL (US)

(73) Assignee: NFT Industries, LLC, Mountain Brook, AL (US)

( * ) Notice: Subject to any disclaimer, the term of this patent is extended or adjusted under 35 U.S.C. 154(b) by 0 days.

(21) Appl. No.: 13/947,393

(22) Filed: Jul. 22, 2013

(65) Prior Publication Data

US 2013/0305795 A1    Nov. 21, 2013

Related U.S. Application Data

(63) Continuation of application No. 13/088,043, filed on Apr. 15, 2011, now abandoned.

(60) Provisional application No. 61/324,948, filed on Apr. 16, 2010.

(51) Int. Cl.
   *C05G 3/00* (2006.01)

(52) U.S. Cl.
   CPC .................................. *C05G 3/0029* (2013.01)

(58) Field of Classification Search
   USPC ................................ 71/11–26, 64.02, 64.07
   See application file for complete search history.

(56) References Cited

U.S. PATENT DOCUMENTS

| | | | |
|---|---|---|---|
| 5,423,897 A | 6/1995 | Hudson et al. | 71/28 |
| 5,472,712 A | 12/1995 | Oshlack et al. | 424/480 |
| 6,287,359 B1 | 9/2001 | Erhardt et al. | 71/64.07 |
| 6,500,223 B1 | 12/2002 | Sakai et al. | 71/64.07 |
| 2011/0214466 A1 | 9/2011 | Yadav | 71/64.07 |
| 2012/0186315 A1 | 7/2012 | Lynch et al. | 71/13 |

FOREIGN PATENT DOCUMENTS

| | | |
|---|---|---|
| JP | 9-263476 | 10/1997 |
| JP | 10-7484 | 1/1998 |

*Primary Examiner* — Wayne Langel
(74) *Attorney, Agent, or Firm* — Paul E. White, Jr.; Manelli Selter PLLC

(57) ABSTRACT

A controlled release fertilizer including a fertilizer granule, having an outer surface, a coating of biopolymer composition on the outer surface of the fertilizer granule, wherein the biopolymer composition includes at least one biopolymer, and a process of making the controlled release fertilizer including the steps of screening fertilizer granules to a preselected granule size, heating a biopolymer to become substantially fluid, and applying the biopolymer onto the surface of the fertilizer granule to produce a coating on the granule of a predetermined amount.

19 Claims, No Drawings

CONTROLLED RELEASE FERTILIZER WITH BIOPOLYMER COATING AND PROCESS FOR MAKING SAME

BACKGROUND OF THE INVENTION

The present invention is directed towards new and entirely unexpected granular fertilizers and processes for making the fertilizers, which provide controlled release of the fertilizer to plants. The fertilizers may include additional advantageous agents such as micro and macro nutrients and other agriculturally beneficial materials. More particularly, the present invention is a granular fertilizer coated with a biologically degradable polymer (biopolymer). When such fertilizer is applied to the soil, microorganisms will degrade the biopolymer coating over time, releasing the fertilizer at a rate controlled by the amount, i.e., thickness of the biopolymer coating and chemical characteristics of the biopolymer, as well as environmental conditions.

There are many slow and extended release fertilizers with their nutrient release based on time and event related coating failures or coating permeability. These fertilizers are influenced by factors such as available soil water, fertilizer solubility, microbial activity in the soil, and the ratio of surface area to nutrient weight of the particle. Of these, the major commercial products are sulfur coated urea, polymer coated ureas, and urea-formaldehyde products such as methylene ureas.

Of the polymer coated fertilizers, almost all are dependent on ambient temperature and moisture, and the thickness of the coating. Most polymer coated fertilizers release nutrients by physical diffusion through a semi-permeable polymer membrane, and the release rate can be controlled by varying the composition and thickness of the coating. The type of fertilizer substrate also may influence the rate of nutrient (e.g., nitrogen) release. Nutrients are released by physical diffusion through the polymer coating.

A more recent polymer coated fertilizer employs a reactive layer coating which combines two reactive monomers as they are simultaneously applied to the fertilizer substrate. These reactions create an ultra-thin membrane coating, which controls nutrient release by osmotic diffusion. The coating thickness determines the diffusion rate and the duration of release for such reactive layer coated products.

Polymer-sulfur coated fertilizers are hybrid products that use a primary coating of sulfur and a secondary polymer coat. These fertilizers were developed to deliver controlled-release performance approaching that of solely polymer-coated fertilizers but at a reduced cost. The nutrient-release mechanism of these coated fertilizers is a combination of diffusion and capillary action. Water vapor must first physically diffuse in through the continuous polymer layer. The rate of diffusion is controlled by the composition and thickness of the polymer film. Once at the polymer-sulfur interface, the water penetrates the defects in the sulfur coat through physical capillary action and begins to dissolve the fertilizer core. The dissolved fertilizer then exits the particle in reverse sequence.

Thermoplastic resins such as polyolefins, polyvinylidene chloride, and copolymers may be employed to coat fertilizers. Because the thermoplastic polymers used are highly impermeable to water, release-controlling agents such as ethylene-vinyl acetate and surfactants are typically added to the coating to obtain the desired physical diffusion characteristics. Coating thicknesses are essentially the same for all of such fertilizers with the release being controlled by the chemical type of release-controlling agent and amount of the agent.

BRIEF SUMMARY OF THE INVENTION

The fertilizers of the present invention are in a granular form and provide controlled release of the fertilizer to plants. The granular fertilizers have a coating of a biologically degradable polymer (biopolymer). When such fertilizer is applied to the soil, microorganisms metabolize or by some mechanism, disrupt the biopolymer coating over time, releasing the fertilizer at a rate controlled by the amount, i.e., thickness of the biopolymer coating and chemical characteristics of the biopolymer, as well as environmental conditions such as soil and/or air temperature and available water. The fertilizers may include additional advantageous agents such as micro and macro nutrients and other agriculturally beneficial materials.

The presently employed coating of biopolymer(s) are bio-based polymers, being derived from biomass such as from plants, fungi and bacteria, and thus possessing potential efficiencies in production from a wide availability and diversity of sources for biomass. In particular, available corn-based polymers of polylactic acid are made from the stock and fibrous parts of the corn plant (not the kernel). Polylactic acid polymers may also be derived from other carbohydrate loaded materials, for example, from wheat, sugar and maize.

Polylactic acid (PLA) is a repeating chain of lactic acid which when decomposing on or in the soil, undergoes a 2-step degradation process. First, moisture and heat facilitate breaking the PLA polymer chains and split them apart, creating smaller polymer chains. Then microorganisms in the soil (and/or enzymes excreted by them) consume (or deteriorate) the smaller polymer fragments and lactic acid as nutrients. Lactic acid is widely found in nature and so a large number of organisms metabolize lactic acid. At a minimum, fungi and bacteria are involved in PLA degradation. The end result of the process is carbon dioxide, water and a tiny amount of organic residue. The degradation process is dependent upon temperature and available water.

DETAILED DESCRIPTION OF THE INVENTION

The present invention is a controlled release fertilizer prepared by coating a granular fertilizer with one or more of a family of biopolymer coating agents including polylactic acid, polylactide, lactide, and/or an oligomer thereof, and processes for making the controlled release fertilizer. The preferred coating material is lactic acid oligomers, such as polylactic acid oligomers. An example of such lactic acid oligomers is Olygos™, a bioresin produced by NatureWorks, LLC which has the following properties for the specific product, Bioresin 120:

| OLYGOS ™ Bioresin 120 Technical Data Sheets Typical (Average) Composition* | | |
|---|---|---|
|  | Bioresin 120 | Method |
| Lactyl-based species | 85% | Titration |
| Organic Acids | 10% | GC-MS |
| Polyols | 4.7% | GC-MS |
| Inorganic Species | ≤0.3% | ICP-AES |
| Typical Properties* | | |
| Color | Dark brown to black | |
| Specific gravity | 1.1 | |
| Specific heat capacity | 2.3 J K$^{-1}$ g$^{-1}$ (0.56 BTU ° F.$^{-1}$ lb$^{-1}$) | |

-continued

OLYGOS ™ Bioresin 120 Technical Data Sheets
Typical (Average) Composition*

|  | Bioresin 120 | Method |
|---|---|---|
| Glass transition temperature | 25-40° C. | |
| Pour point | 120° C. | |
| Viscosity at 210° C. | 98 cP | |
| Gross Calorific (Fuel) Value | 19 kJ g$^{-1}$ (8,300 BTU lb$^{-1}$) | |
| Ash content | 0.4% | |

*Typical composition and properties are not to be construed as specifications.
Bioresin 120 is an amorphous thermoplastic resin based on lactic acid oligomers. It is derived primarily from annually renewable resources. From NatureWorks, LLC, Minnetonka, MN, Typical polylactic acid (PLA) coatings are modified by adding 6.0% wt. (dry basis) corn syrup to the coating melt. This modification improves the flow (less viscous) and sealing (more water impermeable) properties of the PLA. Other such flow and sealing modifiers may be employed, especially high fructose syrups, and also cane syrup, rice syrup and glucose syrup.

In a further embodiment of the present invention, a water proof or water resistant sealant is applied as a second, exterior coating, after the PLA coating application. The sealant can be one or more of the following: Evacote®, Polyvinyl Acetate (PVA), polymer blends, paraffins, micro crystalline waxes, and similar materials. Evacote® is the preferred sealant, manufactured by The International Group, Inc. Evacote® is specialty wax blends that are used as hot melt coatings. The following are characteristics of one Evacote® product:
Evacote® 7272
Physical Properties

| TEST METHODS | ASTM METHOD | SPECIFICATIONS Minimum | SPECIFICATIONS Maximum | TYPICAL |
|---|---|---|---|---|
| Drop Melt Point ° F. (° C.) | D 127 | — | — | 162 (72.2) |
| Congealing Point ° F. (° C.) | D 938 | 151 (66.1) | 161 (71.7) | 156 (68.9) |
| Thermosel Viscosity, cP @ 300° F. (148.9° C.) | D 3236 | 285 | 355 | 320 |
| Thermosel Viscosity, cP @ 275° F. (135° C.) | D 3236 | — | — | 440 |
| Thermosel Viscosity, cP @ 250° F. (121.1° C.) | D 3236 | — | — | 610 |
| Color | D 1500 | — | — | L0.5 |
| Needle Penetration, dmm @ 77° F. (25° C.) | D 1321 | — | — | 7 |
| Needle Penetration, dmm @ 90° F. (32.2° C.) | D 1321 | — | — | 12 |

The typical range of amounts of biopolymer coating, such as PLA, is 1.0 to 10 wt. %, and more preferably the range is 1.0 to 5 wt. %. The biopolymer coating thickness ranges from 50 to 500 microns.

The sealant coating amount is 0.05 to 5 wt. %, and more preferably in the range of 0.5 to 2.0 wt. %.

Fertilizer granule sizes that can be coated range from 2.0 mm to 4.0 mm, and more preferably the size range is between 2.5 mm and 3.3 mm.

The fertilizer may typically include sources of nitrogen, phosphorus and/or potassium compounds.

The nitrogen compounds include urea, ammonia, ammonium nitrate, ammonium sulfate, calcium nitrate, diammonium phosphate, monoammonium phosphate, potassium nitrate and sodium nitrate.

The phosphorous compounds include diammonium phosphate, monoammonium phosphate, monopotassium phosphate, dipotassium phosphate, tetrapotassium pyrophosphate, and potassium metaphosphate.

The potassium compounds include potassium chloride, potassium nitrate, potassium sulfate, monopotassium phosphate, dipotassium phosphate, tetrapotassium pyrophosphate, and potassium metaphosphate.

Where the fertilizer contains nitrogen, phosphorous and potassium compounds, the compounds are for example in a N:P:K ratio selected from the group consisting of 29-3-4, 16-4-8, 10-10-10, 15-5-10, 15-0-15, 22-3-14, 20-28-5 and 12-6-6.

The fertilizer may further include macronutrients including sulfur, calcium and magnesium and/or micronutrients including boron, copper, iron, manganese, molybdenum and zinc.

In the process of making the present controlled release fertilizer, the biopolymer coatings, including PLA coatings or PLA type coatings, can be applied to the surface of fertilizer granules surface by numerous methods including pouring, hydraulic spraying or pneumatic atomized spraying. The initial fertilizer granule sizes that can be coated range from 2.0 mm to 4.0 mm, and more preferably the size range is between 2.5 mm and 3.3 mm. Fertilizer granules are initially screened to obtain the desired size.

Typically, the biopolymer is heated to become substantially fluid to a degree required for the aforementioned methods of coating the biopolymer. The typical range of temperatures for heating the biopolymer for coating the fertilizer granule is 330T to 420T. The heated biopolymer is then applied upon the fertilizer granule to produce a predetermined amount, i.e., thickness of biopolymer coating, wherein the amount of coating is determined on a percent weight basis to result in a typical range of 1.0 to 10 wt. %, and more preferably a range of 1.0 to 5 wt. % biopolymer coating. The biopolymer coating thickness ranges from 50 to 500 microns.

In another embodiment of the present process, at least one flow-sealant modifier such as corn syrup, high fructose syrups, cane syrup, rice syrup and glucose syrup, is blended with the biopolymer before the biopolymer composition is applied to the fertilizer granules.

In all types of application the biopolymer, e.g., PLA type coatings are viscous and tend to form a mass of granules in the processing equipment after the coating is applied. The coated granule mass is quickly cooled to eliminate the tackiness of the coating and thus reduce adhesion between the coated granules. When allowed to cool at ambient conditions agglomerates tend to form which have poor release characteristics.

Accordingly, the process of the present invention employs a quick cooling method that sets the coating surface, thus eliminating agglomerates and coating damage caused by granules pulling apart. After the coating has been applied to the fertilizer granule surface, a cool gas is passed over the granule surface which quickly sets the coating surface. This gas can be nitrogen, carbon dioxide, or refrigerated air. The temperature of the gas is typically −100° F. to +40° F. During this cooling phase the coating bed temperature ranges between 75° F. and 150° F., preferable less than 100° F.

Instead of passing a cooling gas to quickly cool and set the biopolymer coating, parting agents, such as talc, corn starch and diatomaceous earth, have also been applied to eliminate the tackiness from the coating. Parting agent content ranged from 2.5 wt. % to 7.4 wt. % and is applied to the surface of the coated fertilizer granule after minimal cooling, immediately after application of the biopolymer coating and then the biopolymer coated fertilizer with surface coated parting agent is allowed to finally cool.

In another embodiment of the present process, a water proof or resistant sealant is applied over the first coating of biopolymer composition resulting in a twice coated fertilizer granule. The sealant is selected from the group consisting of polyvinyl acetate, waxes, polymer blends, paraffins and micro crystalline waxes. The sealant coating is applied to the surface of the biopolymer coated fertilizer granules by pouring, hydraulic spraying or pneumatic atomized spraying.

The present invention is demonstrated with reference to the following examples, which are of an illustrative nature only and which are to be construed as non-limiting.

EXAMPLES

The following compositions, described in Table 1, are exemplary of the present invention.

TABLE 1

| Product Samples | Product Description And Composition |
|---|---|
| Coating Test 8 | 4.7% Olygos, 6.8% talc on urea |
| Coating Test 9 | 4.6% Olygos and corn syrup, 7.4% talc on urea |
| Coating Test 13 | 4.9% Olygos and corn syrup, 2.5% DE, and 2% paraffin on urea |
| Coating Test 14 | 4.6% Olygos and corn syrup, 7.4% talc, and 2% paraffin on urea |
| Coating Test 15 | 4.7% Olygos, 6.8 talc, and 2% paraffin on urea |
| Coating Test 18 | 2.3% Olygos and corn syrup on urea |
| Coating Test 20 | 2.4% Olygos and corn syrup on urea |
| Coating Test 21 | 2.3% Olygos and corn syrup, 1.5% Evacote 7089A on urea |
| Coating Test 22 | 2.4% Olygos and corn syrup, 1.7% Evacote 7089A on urea |
| Coating Test 23 | 2.3% Olygos and corn syrup, 1.0% IGI 1339A on urea |
| Coating Test 24 | 2.4% Olygos and corn syrup, 1.0% IGI 1339A on urea |
| Coating Test 25 | 2.3% Olygos and corn syrup, 1.5% IGI R-4408A on urea |
| Coating Test 26 | 2.4% Olygos and corn syrup, 1.9% IGI R-4408A on urea |

Example 1

A bench scale test was conducted to produce test product sample 9. The following materials were used:
  665 grams of granular urea (280 SGN)
  31.5 grams of Olygos® Bioresin 120
  3.5 grams of corn syrup (64.0% solids)
  56.1 grams talc
From the afore stated OLYGOS™ Bioresin 120 Technical Data Sheets:

| Typical (Average) Composition* | | |
|---|---|---|
| | Bioresin 120 | Method |
| Lactyl-based species | 85% | Titration |
| Organic Acids | 10% | GC-MS |
| Polyols | 4.7% | GC-MS |
| Inorganic Species | ≤0.3% | ICP-AES |

The biopolymer, Olygos® and flow sealer modifier, corn syrup were combined in a beaker and heated to 360° F. on a hot plate. Urea was placed in a bench scale rotary drum coater (12" diameter) equipped with anti slip rods and preheated to 208° F. to produce fertilizer granules composed of urea. After the Olygos and corn syrup mixture reached 360° F. it was poured over the rolling bed of urea granules and allowed to mix. After the coating application was completed, the parting agent, talc was applied to the rolling bed. The bed was allowed to cool to 120 F then removed from the coating drum.

Example 2

A bench scale test was conducted to produce test product sample 22. The following materials were used:
  672 grams of granular urea (280 SGN)
  25.2 grams of Olygos Bioresin 120
  2.8 grams of corn syrup (64.0% solids)
  9.2 grams of Evacote®

Olygos and corn syrup were combined in a beaker and heated to 355° F. on a hot plate. Urea was placed in a bench scale rotary drum coater (12" diameter) equipped with anti slip rods and preheated to 200° F. After the Olygos and corn syrup mixture reached 355° F. it was poured over the rolling bed of urea granules and allowed to mix. After the coating application was completed, nitrogen was sparged into the rolling bed to quickly cool the coating. The bed was cooled to 70° F.

Evacote® was heated to 185° F. in a beaker on a hot plate prior to pouring on to the rolling bed. Evacote is described above and is a water resistant sealant applied as a second, exterior coating, after the biopolymer coating application.

The bed was allowed to mix for 1 to 2 minutes while maintaining the bed temperature at 110 to 120° F. Compressed air was blown into the drum to cool the bed to 100° F. before discharging.

Test Results

The sample products were tested for controlled release of urea fertilizer. The test results are shown in Table 2 and expressed as the percent of urea retained. The percent of urea retained was determined using Method N-500.00 test method as described below.

In the tested Samples that include a second coating sealant (Samples 13-15, and 21-26), the sealants are paraffin wax, Evacote 7089A, IGI® 1339A and IGI® R-4408A. The characteristics of Evacote 7089A have been stated above. The characteristics of IGI® 1339A and IGI® R-4408A are the following:

IGI 1339A

IGI® 1339A is a paraffinic Fischer-Tropsch wax with low isomer content and high melting point.

Physical Properties

| | ASTM | SPECIFICATIONS | | |
|---|---|---|---|---|
| TEST METHODS | METHOD | Minimum | Maximum | TYPICAL |
| Congealing Point ° F. (° C.) | D 938 | 156 (68.9) | 165 (73.9) | 160 (71.1) |
| Kinematic Viscosity, cSt @ 212° F. (100° C.) | D 445 | 5.5 | 6.5 | 6.0 |
| Oil Content, Wt % | D 721 | — | 0.7 | 0.4 |
| Saybolt Color | D 6045 | +28 | — | +30 |
| Odor | D 1833 | — | 1 | 0 |
| Needle Penetration, dmm @ 77° F. (25° C.) | D 1321 | — | — | 10 |
| Needle Penetration, dmm @ 100° F. (37.8° C.) | D 1321 | — | — | 17 |

Note:
Physical properties for which ONLY a typical value is listed are included as additional information but may not be printed on the COA.

IGI® R-4408A
Physical Properties

| TEST METHODS | ASTM METHOD | SPECIFICATIONS* Minimum | SPECIFICATIONS* Maximum | TYPICAL |
|---|---|---|---|---|
| Drop Melt Point ° F. (° C.) | D 127 | 160 (71.1) | 170 (76.7) | 165 (73.9) |
| Kinematic Viscosity, cSt @ 212° F. (100° C.) | D 445 | 7.5 | 9.0 | 8.5 |
| Flash Point (P.M.), ° F. (° C.) | D 93 | 500 (260) | — | 525 (274) |
| ASTM Color | D 6045 | — | — | 4.5 |
| Needle Penetration, dmm @ 77° F. (25° C.) | D 1321 | — | 20 | 18 |

*Tentative

IGI® R-4408A and IGI® 1339A are manufactured by The International Group, Inc., Titusville, Pa.

Paraffin wax is $C_{20}H_{42}$ to $C_{40}H_{82}$ and is in a solid state at room temperature.

TABLE 2

| Test # | Coating % | Conditioner % | Sealant % | Sealant Type | % Urea Retained* |
|---|---|---|---|---|---|
| Coating Test 9 | 4.6 | 7.4 | 0 | None | 22.7 |
| Coating Test 13 | 4.9 | 2.5 | 2 | Paraffin Wax | 30.0 |
| Coating Test 14 | 4.6 | 7.4 | 2 | Paraffin Wax | 73.6 |
| Coating Test 15 | 4.7 | 6.8 | 2 | Paraffin Wax | 92.4 |
| Coating Test 18 | 2.3 | 0.0 | 0 | None | 32.4 |
| Coating Test 20 | 2.4 | 0.0 | 0 | None | 38.0 |
| Coating Test 21 | 2.3 | 0.0 | 1.5 | Evacote 7089A | 91.4 |
| Coating Test 22 | 2.4 | 0.0 | 1.7 | Evacote 7089A | ~95 |
| Coating Test 23 | 2.3 | 0.0 | 1.0 | IGI 1339A | 19.8 |
| Coating Test 24 | 2.4 | 0.0 | 1.0 | IGI 1339A | ~95 |
| Coating Test 25 | 2.3 | 0.0 | 1.5 | IGI R-4408A | 83.2 |
| Coating Test 26 | 2.4 | 0.0 | 1.9 | IGI R-4408A | 72.8 |

*% Urea Retained as determined using Method N-500.00 test method.

Method N-500.00
Automated Preparation for the Determination of Controlled Release Nitrogen
Scope:
    This is a standard analytical preparation for the determination of controlled release nitrogen components in fertilizer samples and may be used as a preparation for methods N-400.10—"Kjeldahl Ammoniacal Nitrogen", N-400.20—"Kjeldahl Water Soluble Organic Nitrogen", N-400.40—"Automated Ammoniacal Nitrogen", N-400.50—"Automated Urea Nitrogen", and N-400.60—"Automated Nitrate Nitrogen". When samples prepared by this method and method N-400.00—"Break-Down Nitrogen Preparation", are run by the methods listed above, and in conjunction with method N-100.00—"Total Nitrogen Determination", the controlled release nitrogen component can be calculated.
Principle:
    The automated preparation for the determination of con-trolled-release nitrogen is achieved by adding a proportioning pump to the system outlined in AOAC (15th edition) 945.01 and 970.04 to pull water through the column at 2 mL/minute and discarding the separatory funnel.
Reagents and Chemicals:
    D.I. Water 20-25° C.
Apparatus and Equipment:
    Balance, accuracy to 0.001 g.
    Chromatography columns, 1.0 cm×30 cm as needed
    Flask, 250 mL volumetric.
    Glass or Polyester Wool
    Mounting rack
    Proportioning pump
    Pump tubes—2 cc/minute as needed
    Support clamps as needed
    Tubing—1/32 I.D., connectors, and glassware as needed
Sample Preparation Procedure:
Column Preparation:
    1. Reduce an unground sample (a micro-splitter is suggested) to obtain two sub samples of approximately 3 g.
    2. Weigh the two unground subsamples and place them in 1 cm dia. chromatography columns containing a small glass or polyester wool plug.
    System Start-Up:
    1. Place 250 mL of D.I. water in a 250 mL volumetric flask for each sample column.
    2. Clamp columns to mounting rack and connect tubing.
    3. Pour water from flask into column until water level is about 50 mm above the top of the sample (adjust water level so that when the drip starts the water level is 25 mm above the top of the sample).
    4. Place cap on column and the tubing connected to the cap, into the flask with the remaining water.
    5. Place the end of the tubing coming from the proportioning pump into an empty volumetric flask.
    6. Set timer for 2 hours.
    NOTE: At this point your connections should run as follows; water to column cap on column—column bottom to proportioning pump to empty flask.
    7. Turn proportioning pump on and check water level—adjust as in step 3 above.
System Shut-Down:
    1. When all water has been pumped from column remove flask containing extract, bring final volume to 250 mL using D.I. water and shake.
    2. Remove columns and clean.
    3. Clean tubing with 0.1 N HCl and D.I. water.
    4. The following determinations are performed on the extract-nitrate nitrogen, ammoniacal nitrogen and urea nitrogen.
    NOTE: The extract from this method may need to be diluted.
Calculations:
Symbols for Determinations on Ground Samples:
    A=Ammoniacal Nitrogen
    N=Nitrate Nitrogen
    I=Insoluble Nitrogen
    S=Soluble Non-Urea Nitrogen
    T=Total Nitrogen
    UA=Urea Nitrogen+Ammoniacal Nitrogen
    U=Urea Nitrogen
    WA=Water Soluble Nitrogen+Ammoniacal Nitrogen
    W=Water Soluble Nitrogen
    Symbols for Determinations on Extract of Unground Samples:
    NOTE: All results from determinations on extracts of unground samples are the average of both sides of the final split.

A'=Ammoniacal Nitrogen
N'=Nitrate Nitrogen
I'=Insoluble Nitrogen
S'=Soluble Non-Urea Nitrogen
T'=Total Nitrogen
UA'=Urea Nitrogen+Ammoniacal Nitrogen
U'=Urea Nitrogen
WA'=Water Soluble Nitrogen+Ammoniacal Nitrogen
W'=Water Soluble Nitrogen Calculations of Symbols:

$$UA-A=U$$

$$WA-A=W$$

$$W-U=S$$

$$UA'-A'=U'$$

$$WA'-A'=W'$$

$$W'-U'=S'$$

Calculation of Controlled-Release Nitrogen:
1. Coated Urea $$\text{Controlled-Release}=W-U'$$

Alternate Calculation $$\text{Controlled-Release}=T-U'$$

Calculation of Liquid Controlled-Release Nitrogen:
2. Water Soluble Non Urea Nitrogen $$\text{Controlled-Release}=WA-UA' \text{ or}$$

$$\text{Controlled-Release}=(N+WA)-(N'+UA)'$$

3. Controlled-Release Nitrogen:

$$CR=T-(N'+UA')$$

Alternate Calculation $$\text{Controlled-Release}=(N+WA+I)-(N'+UA')$$

REFERENCES

AOAC 15th Edition
1. Method 945.01 "Nitrogen (Water Insoluble) in Fertilizers—Method I".
2. Method 970.04 "Nitrogen (Water Insoluble) in Fertilizers—Method II".

While only a few exemplary embodiments of this invention have been described in detail, those skilled in the art will recognize that there are many possible variations and modifications which may be made in the exemplary embodiments while yet retaining many of the novel and advantageous features of this invention. Accordingly, it is intended that the following claims cover all such modifications and variations.

What is claimed is:

1. A controlled release fertilizer comprising:
a fertilizer granule, having an outer surface;
a first coating of biopolymer composition, having thickness of 50 to 500 microns, on the outer surface of the fertilizer granule, wherein said biopolymer composition includes at least one biopolymer selected from the group consisting of polylactic acid, polylactide, lactide, and oligomers thereof which is a bio-based polymer made from biomass selected from the group consisting of plants, fungi and bacteria; and
a second coating immediately over the first coating of biopolymer composition, wherein the second coating is polyvinyl acetate.

2. The controlled release fertilizer of claim 1, wherein the amount of biopolymer in the coating of biopolymer composition is less than 100%.

3. The controlled release fertilizer of claim 1, wherein the amount of coating of biopolymer composition is 1.0 to 10 wt. %.

4. The controlled release fertilizer of claim 1, wherein the coating of biopolymer composition further includes at least one flow-sealant modifier.

5. The controlled release fertilizer of claim 4, wherein the flow-sealant modifier is selected from the group consisting of corn syrup, high fructose syrups, cane syrup, rice syrup and glucose syrup.

6. The controlled release fertilizer of claim 1, wherein the second coating is includes an additional component selected from the group consisting of waxes, polymer blends, paraffins and micro crystalline waxes.

7. The controlled release fertilizer of claim 1, wherein the amount of second coating is 0.05 to 5 wt. %.

8. The controlled release fertilizer of claim 1, wherein the fertilizer granule includes a plant nutrient selected from the group consisting of nitrogen, phosphorus and potassium compounds.

9. The controlled release fertilizer of claim 8, wherein the nitrogen compound is selected from the group consisting of urea, ammonia, ammonium nitrate, ammonium sulfate, calcium nitrate, diammonium phosphate, monoammonium phosphate, potassium nitrate and sodium nitrate.

10. The controlled release fertilizer of claim 8, wherein the phosphorous compound is selected from the group consisting of diammonium phosphate, monoammonium phosphate, monopotassium phosphate, dipotassium phosphate, tetrapotassium pyrophosphate, and potassium metaphosphate.

11. The controlled release fertilizer of claim 8, wherein the potassium compound is selected from the group consisting of potassium chloride, potassium nitrate, potassium sulfate, monopotassium phosphate, dipotassium phosphate, tetrapotassium pyrophosphate, and potassium metaphosphate.

12. The controlled release fertilizer of claim 8, wherein the fertilizer contains nitrogen, phosphorous and potassium compounds in a N:P:K ratio selected from the group consisting of 29-3-4, 16-4-8, 10-10-10, 15-5-10, 15-0-15, 22-3-14, 20-28-5 and 12-6-6.

13. The controlled release fertilizer of claim 1, wherein the fertilizer granule includes a macronutrient selected from the group consisting of sulfur, calcium and magnesium and/or micronutrients including boron, copper, iron, manganese, molybdenum and zinc.

14. A process of making a controlled release fertilizer comprising the following steps:
screening fertilizer granules to a preselected granule size;
heating a biopolymer selected from the group consisting of polylactic acid, polylactide, lactide, and oligomers thereof which is a bio-based polymer made from biomass selected from the group consisting of plants, fungi and bacteria, to become substantially fluid;
applying the biopolymer onto the surface of the fertilizer granule to produce a first coating on the granule, having thickness of 50 to 500 microns; and
applying a second coating immediately over the first coating of biopolymer composition, wherein the second coating is polyvinyl acetate.

15. The process of claim 14, wherein the biopolymer coating, is applied to the surface of the fertilizer granule surface by pouring, hydraulic spraying or pneumatic atomized spraying.

16. The process of claim 14, wherein the amount of coating of biopolymer is determined on a percent weight basis to result in a range of 1.0 to 10 wt. %.

17. The process of claim 14, further comprising after the biopolymer application step, the step of passing a cooling gas over the coated granules to quickly set the biopolymer.

18. The process of claim 14, further comprising after the biopolymer application step, a step of applying a parting agent to the surface of the biopolymer coated fertilizer granules.

19. The process of claim 14, wherein, in the step of heating the biopolymer, a flow-sealant modifier selected from the group consisting of corn syrup, high fructose syrups, cane syrup, rice syrup and glucose syrup is mixed with the biopolymer.

* * * * *